(12) United States Patent
Kai et al.

(10) Patent No.: US 7,249,781 B2
(45) Date of Patent: Jul. 31, 2007

(54) AUTOMOTIVE AIR BAG DEVICE

(75) Inventors: Takeshi Kai, Wako (JP); Yukihiro Kunitake, Wako (JP); Yuji Ishizuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 367 days.

(21) Appl. No.: 10/903,199

(22) Filed: Jul. 29, 2004

(65) Prior Publication Data

US 2005/0023805 A1 Feb. 3, 2005

(30) Foreign Application Priority Data

Aug. 1, 2003 (JP) ............... 2003-205389

(51) Int. Cl.
*B60R 21/20* (2006.01)
(52) U.S. Cl. .................................. 280/728.3
(58) Field of Classification Search ............ 280/728.3, 280/743.2, 732
See application file for complete search history.

(56) References Cited

U.S. PATENT DOCUMENTS

| | | | | |
|---|---|---|---|---|
| 5,536,043 A | * | 7/1996 | Lang et al. | ................. 280/753 |
| 5,931,493 A | * | 8/1999 | Sutherland | ................ 280/730.1 |
| 5,992,876 A | * | 11/1999 | Gray | ........................ 280/728.3 |
| 6,039,380 A | * | 3/2000 | Heilig et al. | ................... 296/70 |
| 6,338,501 B1 | * | 1/2002 | Heilig et al. | ................. 280/753 |
| 6,435,554 B1 | * | 8/2002 | Feldman | ................... 280/743.2 |
| 6,929,280 B2 | * | 8/2005 | Yasuda et al. | ............ 280/728.2 |

FOREIGN PATENT DOCUMENTS

JP 54-1711 1/1979

* cited by examiner

*Primary Examiner*—Faye M. Fleming
(74) *Attorney, Agent, or Firm*—Lahive & Cockfield, LLP; Anthony A. Laurentano, Esq.

(57) ABSTRACT

An automotive air bag device has a panel, a folded bag installed in a deeper portion behind the panel, a cover provided in the panel and a connecting member that connects a vehicle body side with the cover. The air bag is inflated by virtue of a gas pressure to push open the cover provided so that the air bag deploy into a passenger compartment, the cover is mounted in the panel so as to be separated from the panel when the air bag is inflated and the connecting member controls a protrusion of the air bag into a passenger compartment.

17 Claims, 8 Drawing Sheets

United States Patent US 7,249,781 B2

AUTOMOTIVE AIR BAG DEVICE

The present invention claims foreign priority to Japanese patent application No. JP-2003-205389, filed on Aug. 1, 2003, the contents of which is incorporated herein by reference.

BACKGROUND OF THE INVENTION

1. Field of the Invention

The present invention relates to an improved automotive air bag device.

2. Description of the Related Art

Conventionally, there has been known, as an automotive air bag device, an air bag device installed in a part of a steering wheel (for example, See Japanese Utility Model Examined Publication JP-UM-Y-54-1711 pages 2 to 3, FIG. 1).

Figure 6:
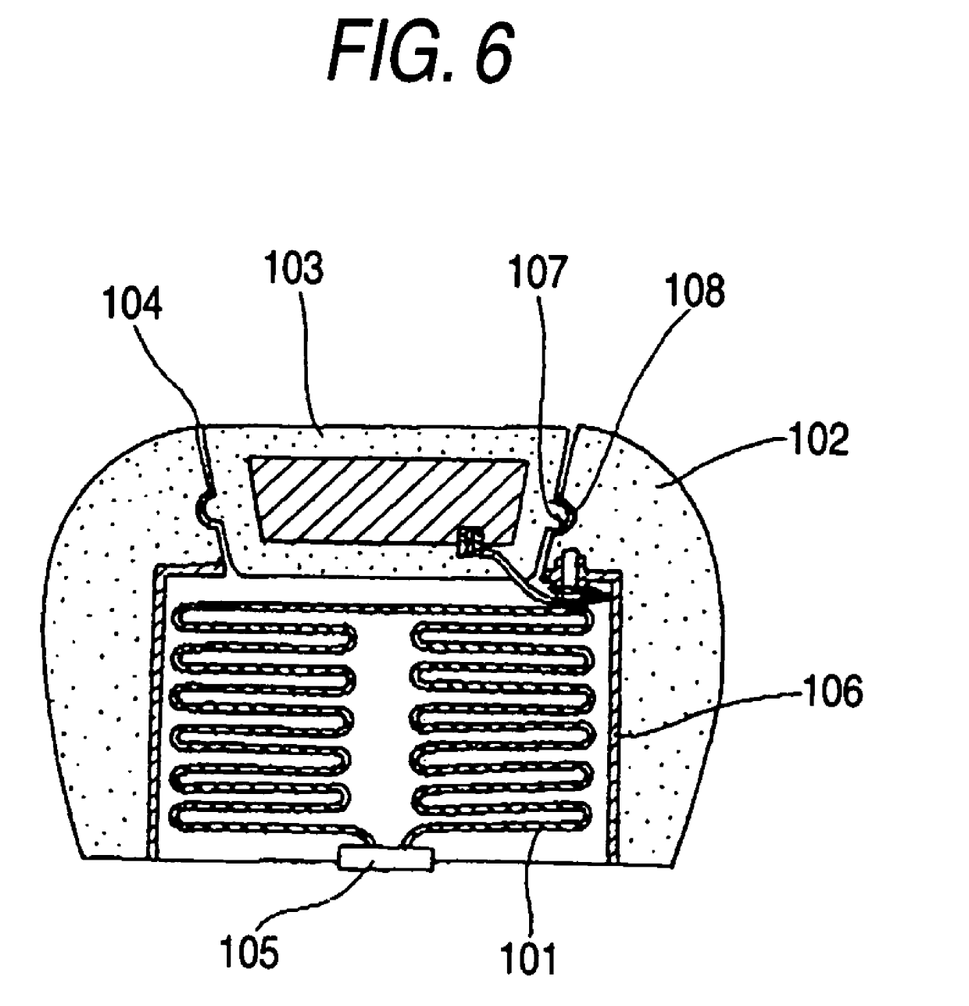
FIG. 6 is a drawing incorporated herein to show FIG. 1 of JP-UM-Y-54-1711.

FIG. 6 is incorporated herein to show FIG. 1 of the JP-UM-Y-54-1711. However, reference numerals are changed.

Reference numeral 101 denotes a gas bag, reference numeral 102 denoting a bag housing case, reference numeral 103 denoting a lid, reference numeral 104 denoting a gas bag protruding opening, reference numeral 106 denoting a lining, reference numeral 107 denoting an elongate convex portion, and reference numeral 108 denoting an elongate concave portion.

Figure 7A:
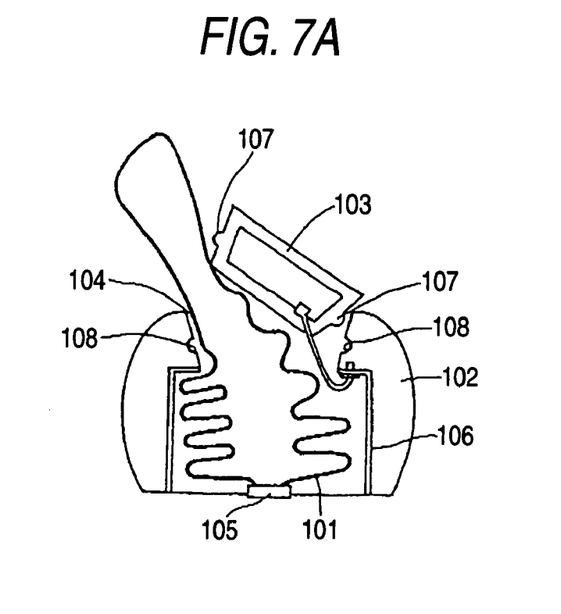
FIG. 7A is a first drawing illustrating a drawback of a gas bag illustrated in FIG. 6 which results when the gas bag is deployed.
Figure 7B:
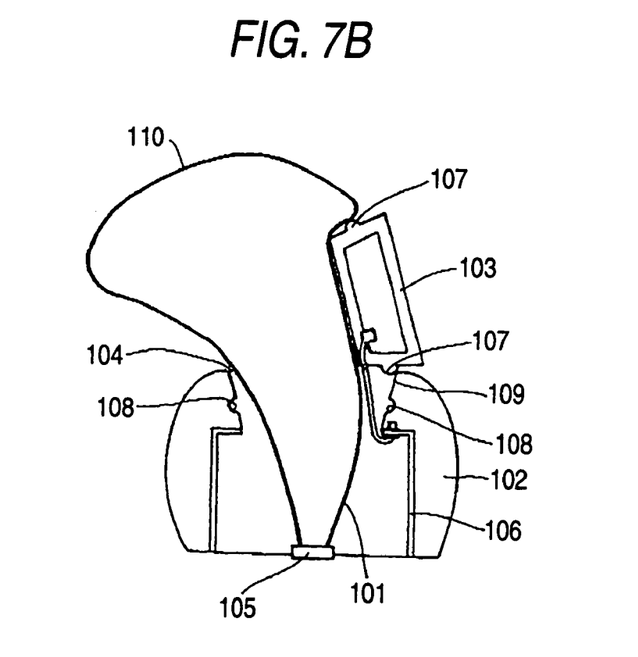
FIG. 7B is a second drawing illustrating a drawback of a gas bag illustrated in FIG. 6 which results when the gas bag is deployed.

FIGS. 7A and 7B are drawings showing a drawback caused when the gas bag shown in FIG. 6 deploys.

FIG. 7A shows an initial stage of the deployment of the gas bag. When a vehicle detects an object with which it would collide, a signal activating the gas bag is transmitted to the gas generator 105 by the action of the sensor. The gas bag 101 is inflated by a gas and is introduced thereinto. The gas bag 101 dislocates the elongate convex portions 107 that fit in the elongate concave portions 108 so as to push up the lid 103 and starts to deploy into the passenger compartment from the gas bag protruding opening 104.

FIG. 7B is a drawing showing a drawback caused in an intermediate stage of the deployment of the gas bag. When the gas bag 101 fills with the gas from the gas generator 105, the lid 3 opens like a door that opens on one side thereof or in a cantilever-like fashion. The deployment direction of a gas bag distal end portion 110 is caused to deviate (for example, to the diagonally left front), whereby there may be caused a risk that the deployment of the gas bag becomes incomplete.

Thus, in the patent literature JP-UM-Y-54-1711, the gas bag 101 is subject to the resistance of the lid 103 and the deployment direction thereof is caused to deviate. Thereby there may be caused a risk that the gas bag 101 cannot deploy into a uniform parabola.

SUMMARY OF THE INVENTION

Then, an object of the invention is to provide an automotive air bag device which can deploy an air bag more uniformly.

With a view to attaining the object, according to a first aspect of the invention, there is provided an automotive air bag device has a panel, a folded bag installed behind the panel, a cover provided in the panel, and a connecting member that connects a vehicle body side with the cover. Wherein the air bag is inflated by virtue of a gas pressure to push open the cover so that the air bag deploy into a passenger compartment, the cover is mounted in the panel so as to be separated from the panel when the air bag is inflated, and the connecting member controls a protrusion of the air bag into a passenger compartment.

According to a second aspect of the present invention as set forth in the first aspect of the present invention, wherein the connecting body comprises at least two parallel pieces so that the cover moves in a substantially parallel posture to a surface of the panel.

According to a third aspect of the present invention as set forth in the first aspect of the present invention, the automotive air bag device further has a thinned portion provided between the cover and the panel. Wherein the cover is provided in the panel via a thinned portion.

According to a fourth aspect of the present invention as set forth in the first aspect of the present invention, wherein the panel is an instrument panel.

According to a fifth aspect of the present invention as set forth in the first aspect of the present invention, wherein the connecting member is string-like shape.

According to a sixth aspect of the present invention as set forth in the first aspect of the present invention, wherein the connecting member is ribbon-like shape.

According to a seventh aspect of the present invention as set forth in the first aspect of the present invention, wherein the cover has a protrusion portion, and the panel has a recessed portion that engages with the protrusion portion of the cover.

According to an eighth aspect of the present invention as set forth in the first aspect of the present invention, wherein a distal end of the air bag is a parabola-like pattern while a central portion thereof is restrained from the deployment by the cover.

According to a ninth aspect of the present invention as set forth in the first aspect of the present invention, wherein the material of the panel is different from a material of the cover.

According to a tenth aspect of the present invention as set forth in the first aspect of the present invention, wherein the cover is formed separately from the cover.

According to an eleventh aspect of the present invention as set forth in the first aspect of the present invention, wherein the connecting body is made of an elastic rubber or a synthetic resin.

According to a twelfth aspect of the present invention as set forth in the first aspect of the present invention, wherein the automotive air bag device is provided on a lower portion of an instrument panel.

According to a thirteenth aspect of the present invention as set forth in the first aspect of the present invention, wherein the automotive air bag device is provided so as to be opposed to a knee portion of an occupant.

According to a fourteenth aspect of the present invention as set forth in the third aspect of the present invention, wherein the thinned portion, the cover and the panel are integrally formed.

According to a fifteenth aspect of the present invention as set forth in the first aspect of the present invention, wherein the connecting member is provided in an inner side of the air bag.

According to a sixteenth aspect of the present invention according to the first aspect of the present invention, wherein the connecting member has a first fixing portion that fixes to the cover, the first fixing portion controls a protrusion of the air bag into a passenger compartment when the air bag is inflated.

According to a seventeenth aspect of the present invention as set forth in the first aspect of the present invention, wherein the connecting member has a second fixing portion

DETAILED DESCRIPTION OF THE PREFERRED EMBODIMENTS

Embodiments of the invention will be described based on the accompanying drawings. Note that the drawings are to be seen in a direction in which reference numerals stand properly.

Figure 1:
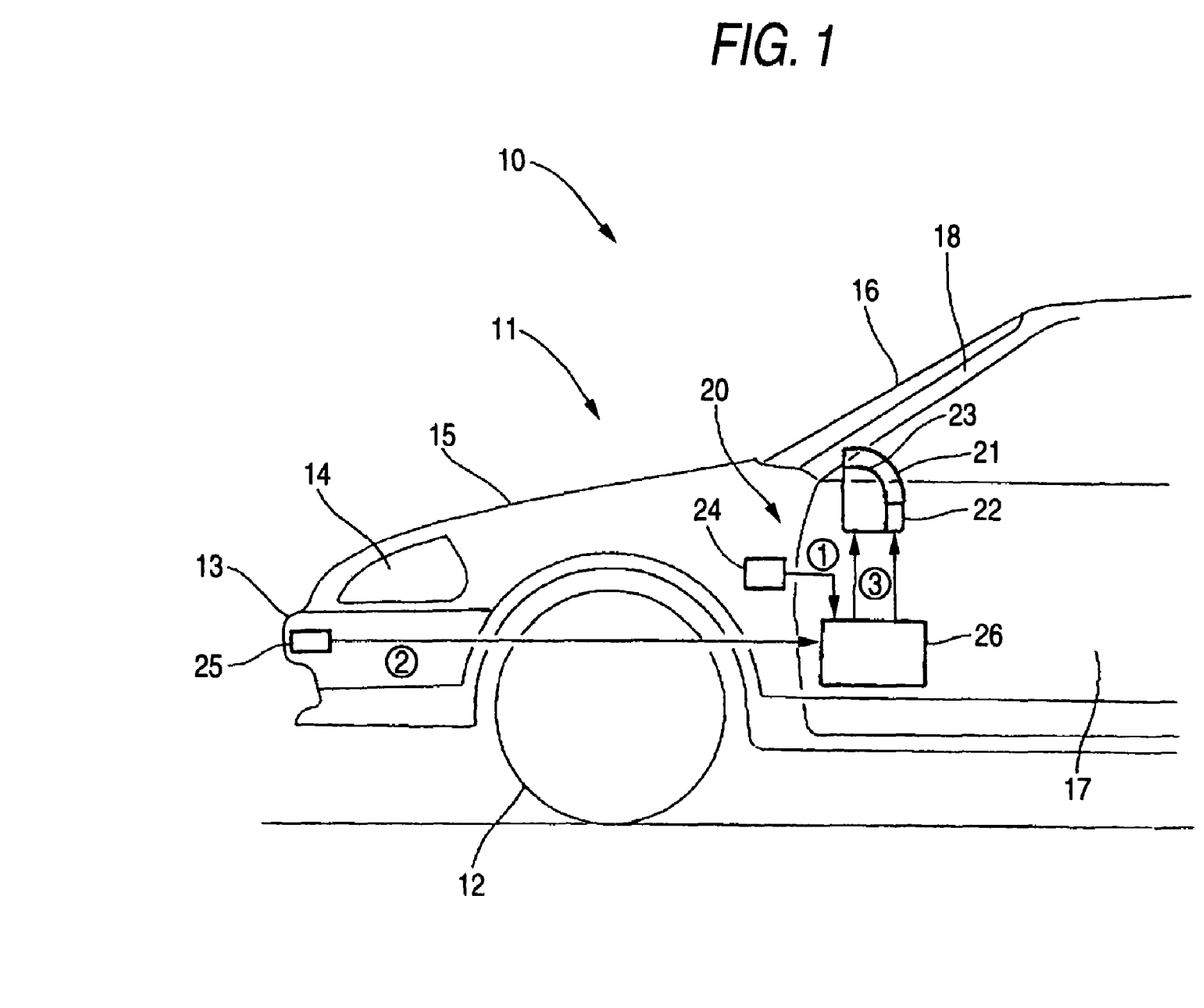
FIG. 1 is a drawing of an automobile air bag system into which an air bag device according to the invention is incorporated.

FIG. 1 shows an automotive air bag system into which an air bag device according to the invention is incorporated, in which reference numeral 10 denotes an automobile, reference numeral 11 denoting a vehicle body, reference numeral denoting a front wheel, reference numeral 13 denoting a front bumper, reference numeral 14 denoting a headlamp, reference numeral 15 denoting a bonnet, reference numeral 16 denoting a windscreen, reference numeral 17 denoting a door, and reference numeral 18 denoting a front pillar.

An air bag system 20 includes a primary driver air bag device 21 and a secondary driver air bag device 22 which are both designed to protect the driver, a front seat passenger air bag device 23 for protecting a front seat passenger, an acceleration sensor 24 for detecting an impact given to the automobile 10, a detection sensor 25 for detecting that the front bumper 13 hits an object, and a control unit 26 for inflating and deploying the primary driver air bag device 21, the secondary driver air bag device 22 and the front seat passenger air bag device 23 based on information received from the acceleration sensor 24 and the detection sensor 25.

Namely, when the acceleration sensor 24 detects an impact which exceeds a predetermined value and when the detection sensor 25 detects that the automobile 10 has hit an object, the control unit 26 detects the impact that has been transmitted thereto as indicated by an arrow 1 and an arrow 2 and sends out signals as indicated by arrows 3, so that the primary driver air bag device 21, the secondary driver air bag device 22 and the front seat passenger air bag device 23 are caused to expand to deploy, whereby the air bag system 20 is activated.

Figure 2:
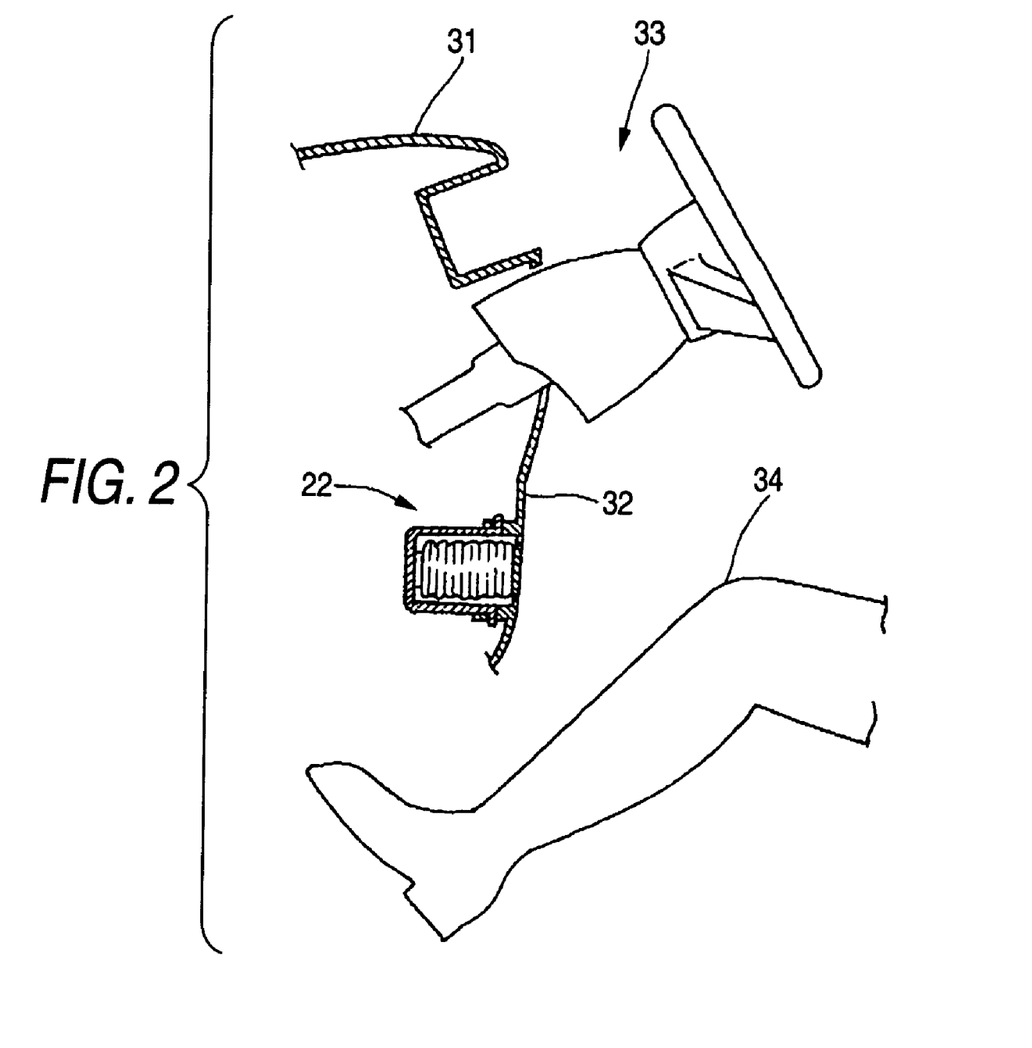
FIG. 2 is a drawing showing a mounting example of the air bag device according to the invention.

FIG. 2 is a drawing illustrating an example of mounting an air bag device according to the invention, and, for example, the secondary driver air bag device 22 is installed in a deeper portion behind a panel lower 32 of an instrument panel 31, the installation place largely differing from a conventional one in which the air bag device is installed in a part of a steering wheel 33. Note that reference numeral 34 denotes the knee of the driver.

Figure 3:
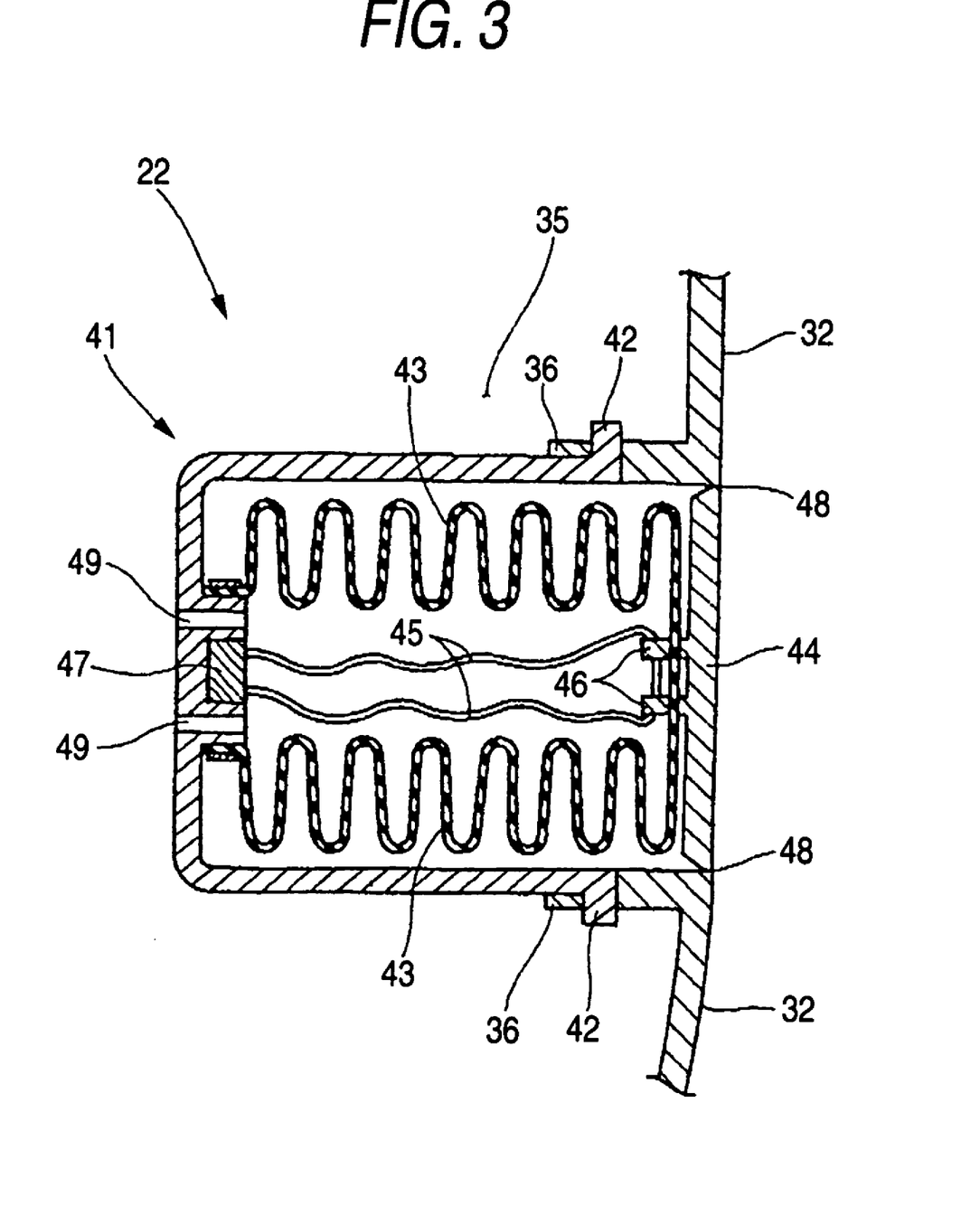
FIG. 3 is a cross-sectional view of a main part of the air bag device when the air bag is not inflated.

FIG. 3 is a cross-sectional view of a main part of the air bag device when the air bag device is not inflated. The secondary driver air bag device 22 is a structure including an accommodating container main body 41, main body fixing portions 42, 42 which fit in panel connecting portions 36, 36, respectively, in a deeper portion 35 behind the panel lower 32 of the instrument panel 31 (refer to FIG. 2), a bag 43 compressed and folded in the interior of the accommodating container main body 41, a cover 44 for pressing down the air bag 43, strings or similar connecting bodies 45 connected to the cover 44, strings or similar connecting bodies connecting portions 46 for connecting the cover 44 and the strings or similar connecting bodies 45, a vehicle body side strings or similar connecting bodies connecting portion 47 for connecting the other ends of the strings or similar connecting bodies 45 to the vehicle body side, thinned portions 48, 48 disposed on upper and lower sides of the cover 44 and located between the instrument panel lowers 32, 32 and gas introducing ports 49, 49 through which gas is blown into the air bag 43 for deployment thereof.

Figure 4A:
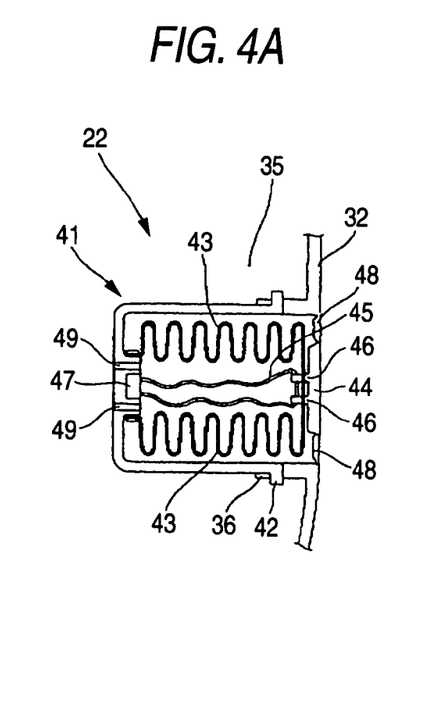
FIG. 4A is a first explanatory drawing for explaining a function of the air bag device when the device is deployed.
Figure 4B:
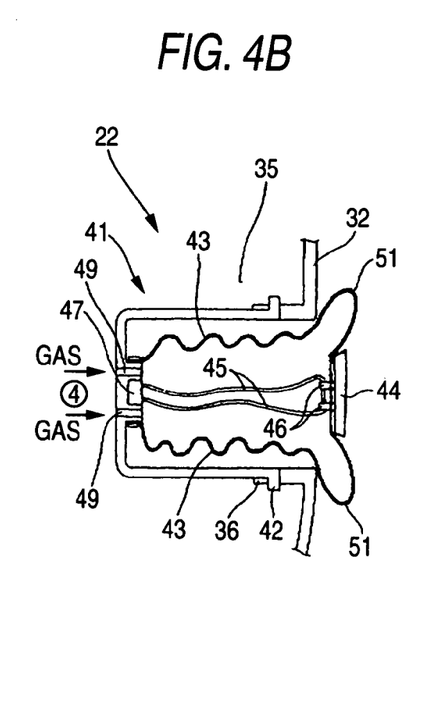
FIG. 4B is a second explanatory drawing for explaining a function of the air bag device when the device is deployed.
Figure 4C:
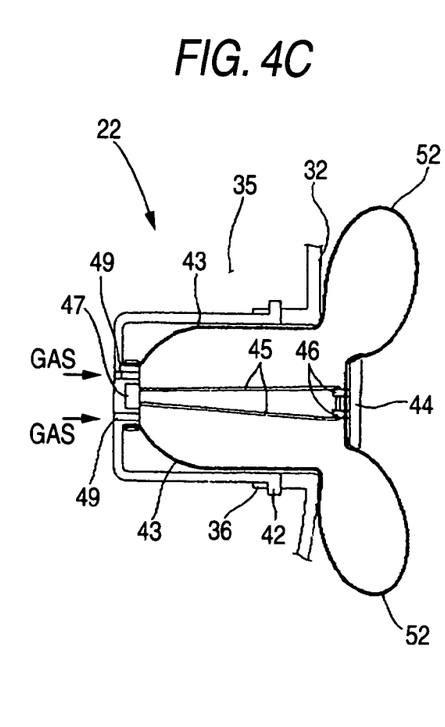
FIG. 4C is a third explanatory drawing for explaining a function of the air bag device when the device is deployed.

FIG. 4A to FIG. 4C are explanatory drawings explaining the function of the air bag device when it deploys.

FIG. 4A shows the air bag device when it is not inflated, and the air bag device remains exactly the same as the structure illustrated in FIG. 3, wherein the air bag 43 is accommodated in the interior of the accommodating container main body 41 in a compressed and folded state.

FIG. 4B shows an initial stage of the inflation and deployment of the air bag. When an impact detected by the acceleration sensor 24 and the detection sensor 25, which are shown in FIG. 1, is transmitted to the control unit 26, a signal sent out from the control unit 26 is then transmitted to the gas generator, whereby a gas (mainly, air is used) enters the interior of the air bag 43 through the gas introducing ports 49 as indicated by arrows 4. The air bag 43 that is so inflated pushes out the cover 44 and breaks the thinned portions 48, 48 (refer to FIG. 4A), and a bag distal end 51 of the air bag 43 that has started to deploy dashes out from the thinned portions so broken.

FIG. 4C shows a final stage of the inflation and deployment of the air bag. The distal end 52 of the air bag that has been completely inflated and deployed then dashes out into the passenger compartment side. As this occurs, since the cover 44 is connected to the vehicle body side strings or similar connecting bodies connecting portion 47 via the strings or similar connecting bodies connecting portions 46 and the strings or similar connecting bodies 45, a fly-out distance of the cover 44 is controlled by the strings or similar connecting bodies 45 which extend to a certain length when the air bag 43 is inflated and deployed at the final stage of the inflation and deployment thereof.

Consequently, the distal end 52 of the air bag that has completed its inflation and deployment is formed into a parabola-like pattern while a central portion thereof is being restrained from the deployment by the cover 44, and the inflation and deployment of the air bag is thus completed.

Since the cover 44 is connected to the vehicle body side with the strings or similar connecting bodies 45, the cover is allowed to be separated toward the passenger compartment side to such an extent that the inflation of the air bag 43 is not interrupted, and therefore, there is caused no risk that the cover 43 flies into the passenger compartment. In addition, the deployment pattern of the air bag 43 can be controlled by the cover 44 and the strings or similar connecting bodies 45.

As a result, the air bag 43 is allowed to inflate to a size which can stabilize a deploying behavior and absorb earlier energy caused by the collision, whereby a highly efficient occupant protecting performance can be obtained. In addition, an optimized deployment of the air bag 43 can be implemented by controlling the protruding amount of the distal end 52.

In addition, since the air bag 43 breaks the thinned portions 48, 48, there is caused less resistance at the broken and opened portions around the cover 44, and an air bag surface for restraining the body to be protected can be formed earlier.

Figure 5A:
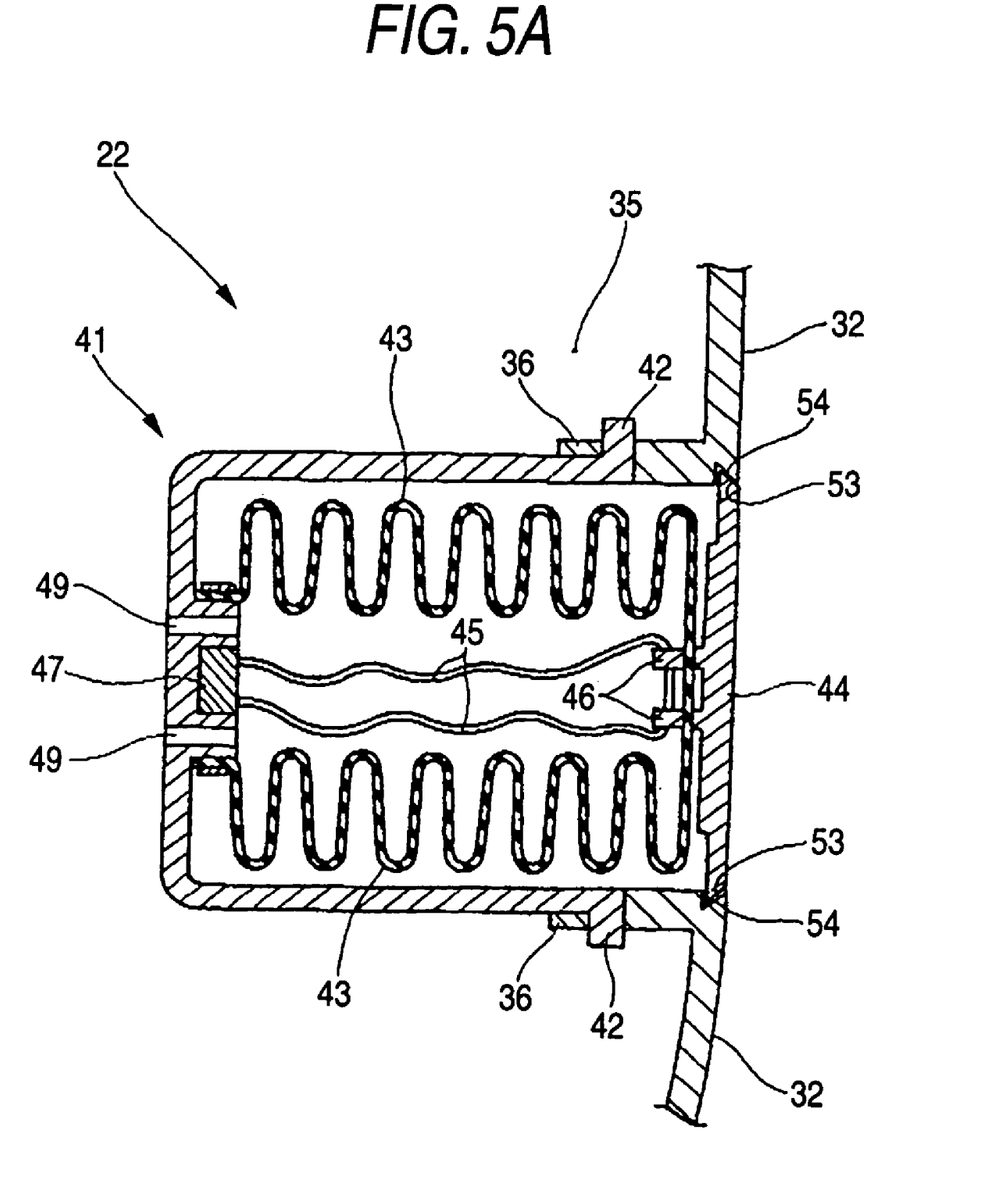
FIG. 5A is a drawing another embodiment which differs from the embodiment illustrated in FIG. 3.
Figure 5B:
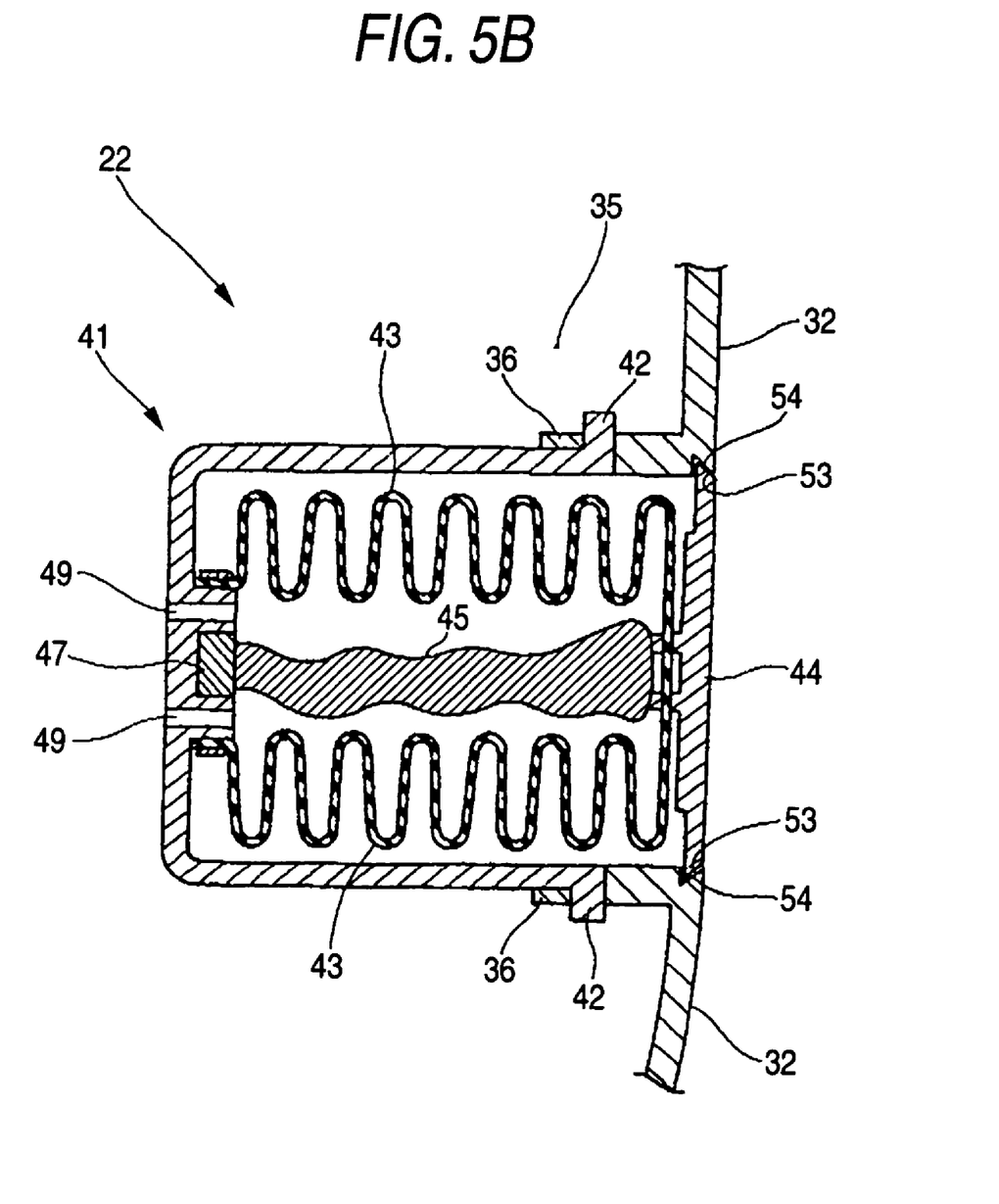
FIG. 5B is a drawing another embodiment which differs from the embodiment illustrated in FIG. 5A.

FIG. 5A shows another embodiment, which differs from the embodiment illustrated in FIG. 3, in which a secondary driver air bag device 22 is a structure including an accommodating container main body 41, main body fixing portions 42, 42 which fit in panel connecting portions 36, 36, respectively, in a deeper portion 35 behind the panel lower 32 of the instrument panel 31 (refer to FIG. 2), a bag 43 compressed and folded in the interior of the accommodating container main body 41, a cover 44 for pressing down the air bag 43, strings or similar connecting bodies 45 connected to the cover 44, strings or similar connecting bodies connecting portions 46 for connecting the cover 44 and the strings or similar connecting bodies 45, a vehicle body side strings or similar connecting bodies connecting portion 47 for connecting the other ends of the strings or similar connecting bodies 45 to the vehicle body side, cover convex portions 53, 53, panel concave portions 54, 54 which fit on the cover convex portions 53, 53, and gas introducing ports 49, 49 through which gas is blown into the air bag 43 for deployment thereof.

Namely, in this embodiment, the cover 44 is constructed to be mounted in the panel lower 32 by causing the cover convex portions 53, 53 to fit in the panel concave portions 54, 54, respectively.

As a result, the instrument panel 31 (refer to FIG. 2) and the cover 44 can be produced separately. The instrument panel 31 (refer to FIG. 2) and the cover 44 can be freely produced from the same materials in the same color or from different materials in different colors. As a result, the degree of freedom in design can be enhanced.

Note that there is imposed no particular limitation on kinds of materials for the air bag 43, provided that flexible fabric or the material coated with rubber or synthetic resin is used.

In addition, there is imposed no limitation on kinds of materials for the strings or similar connecting bodies 45, provided that materials of rubber system or synthetic resin system which are superior in resilience and strength are used.

Furthermore, there is imposed no limitation on shapes of the accommodating container main body 41 for containing the air bag 43, and any shapes which can allow for the smooth inflation and deployment of the air bag 43 are used.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

Being constructed as has been described heretofore, the invention exhibits the following advantages.

According to the first aspect of the invention, since the cover is connected to the vehicle body side with the string or similar connecting body, the cover is separated toward the passenger compartment side to such an extent that the inflation of the air bag is not interrupted, and thus, there is caused no risk that the cover flies into the passenger compartment. In addition, the deployment pattern of the air bag can be controlled by the cover and the string or similar connecting body.

According to the second aspect of the invention, constituting the string or similar connecting body by a plurality of pieces allows the posture of the air bag when separated to remain as stable as possible. As a result, the air bag is allowed to deploy to any other directions than one blocked by the cover to form a uniform parabolic pattern.

According to the third aspect of the invention, since the cover is fixed via the thinned portions, the resistance caused by the cover when the air bag breaks the thinned portions for deployment is reduced, and thus the deployment pattern and performance of the air bag can be exhibited in an earlier stage.

In addition, since the thinned portions and the cover portion can be both formed as integral parts of the panel, it is possible to produce the panel at lower costs.

What is claimed is:

1. An automotive air bag device, comprising:
   a panel;
   a folded air bag installed behind the panel;
   a cover provided in the panel;
   a first and second gas introducing ports that provides air into the air bag;
   a connecting member that is provided in an inner side of the air bag and connects a vehicle body side with the cover; and
   a fixing portion that connects the vehicle body side with the connecting member, the fixing portion being in between the first and second gas introducing ports,
   wherein the air bag is inflated by virtue of a gas pressure to push open the cover so that the air bag deploys into a passenger compartment,
   wherein the cover is mounted in the panel so as to be separated from the panel when the air bag is inflated, and
   the connecting member controls a protrusion of the air bag into a passenger compartment.

2. An automotive air bag device as set forth in claim 1, wherein the connecting member comprises at least two parallel pieces so that the cover moves in a substantially parallel posture to a surface of the panel.

3. An automotive air bag device as set forth in claim 1, further comprising:
   a thinned portion provided between the cover and the panel,
   wherein the cover is provided in the panel via the thinned portion.

4. An automotive air bag device as set forth in claim 1, wherein the panel comprises an instrument panel.

5. An automotive air bag device as set forth in claim 1, wherein the connecting member comprises string-like shape.

6. An automotive air bag device as set forth in claim 1, wherein the connecting member has a ribbon-like shape.

7. An automotive air bag device as set forth in claim 1, wherein the cover has a protrusion portion, and wherein the panel has a recessed portion that engages with the protrusion portion of the cover.

8. An automotive air bag device as set forth in claim 1, wherein a distal end of the air bag has a parabola-like pattern while a central portion thereof is restrained from deployment by the cover.

9. An automotive air bag device as set forth in claim 1, wherein the panel is formed of a material that is different than a material of the cover.

10. An automotive air bag device as set forth in claim 1, wherein the cover is formed separately from the panel.

11. An automotive air bag device as set forth in claim 1, wherein the connecting member is made of an elastic rubber or a synthetic resin.

12. An automotive air bag device as set forth in claim 1, wherein the automotive air bag device is provided on a lower portion of an instrument panel.

13. An automotive air bag device as set forth in claim 1, wherein the automotive air bag device is provided so as to be opposed to a knee portion of an occupant.

14. An automotive air bag device as set forth in claim 3, wherein the thinned portion, the cover and the panel are integrally formed.

15. An automotive air bag device as set forth in claim 1, wherein the connecting member has a first fixing portion that fixes to the cover, wherein the first fixing portion controls a protrusion of the air bag into a passenger compartment when the air bag is inflated.

16. An automotive air bag device as set forth in claim 1, wherein the fixing portion is provided on a surface of the vehicle body side so as to oppose to the cover.

17. An automotive air bag device, comprising a panel;

a folded bag installed behind the panel;

a cover provided in the panel; and a connecting member tat connects a vehicle body side with the cover, wherein the air bag is inflated by virtue of a gas pressure to push open the cover so that the air bag deploy into a passenger compartment, the cover is mounted in the panel so as to be separated from the panel when the air bag is inflated.

the connecting member controls a protrusion of the air bag into a passenger compartment, the connecting body comprises at least two parallel pieces so tat the cover moves in a substantially parallel posture to a surface of the panel, when the air bag is inflated, an end of the air bag protrudes to the passenger compartment relative to the cover so as to protect a knee of a passenger.

* * * * *